United States Patent [19]

Allman

[11] Patent Number: 5,410,441
[45] Date of Patent: Apr. 25, 1995

[54] CIRCUIT FOR PROTECTING DC POWERED DEVICES FROM IMPROPER SUPPLY VOLTAGES

[75] Inventor: Michael E. Allman, Schaumburg, Ill.

[73] Assignee: Motorola, Inc., Schaumburg, Ill.

[21] Appl. No.: 11,617

[22] Filed: Feb. 1, 1993

[51] Int. Cl.$^6$ .............................................. H02H 3/18
[52] U.S. Cl. ...................................... 361/18; 361/84; 361/91; 307/127
[58] Field of Search ................. 361/18, 84, 91, 50, 361/86, 51; 307/127

[56] References Cited

U.S. PATENT DOCUMENTS 4,958,251 9/1990 Cini et al. .............................. 361/84

Primary Examiner—Todd Deboer
Attorney, Agent, or Firm—James A. Coffing; Timothy W. Markison

[57] ABSTRACT

A circuit for protecting direct current (DC) powered devices from excessive supply voltage and reverse polarity supply voltage comprises supply voltage coupling circuitry that operably couples a DC powered device to a supply voltage. The circuit also includes a first field effect transistor (FET) having an intrinsic diode operably coupled to the supply voltage coupling circuitry. Further, the circuit includes first current blocking circuitry operably coupled to the first FET for blocking current flow through the intrinsic diode. Still further, the circuit comprises gate supply circuitry operably coupled to the first FET and the supply voltage coupling circuitry to supply gate voltage to the first FET when the supply voltage is less than a predetermined value. Finally, the circuit includes second blocking circuitry operably coupled to the gate supply circuitry to block current flow to the gate supply circuitry when the supply current is reversely coupled to the DC powered device such that the gate supply circuitry does not supply gate voltage to the first FET.

6 Claims, 1 Drawing Sheet

CIRCUIT FOR PROTECTING DC POWERED DEVICES FROM IMPROPER SUPPLY VOLTAGES

FIELD OF THE INVENTION

This invention relates generally to the protection of Direct Current (DC) powered devices and, in particular, to protection of DC powered devices from improper installation of a supply voltage.

BACKGROUND OF THE INVENTION

As is known, DC powered devices may be destroyed from improper installation of a supply voltage. Improper installation of a supply voltage results when the supply voltage is at an excessively high potential or when the supply voltage is installed with reverse polarity. Protection from an improperly installed supply voltage is highly desirable to inhibit possible destruction of the DC powered device.

To protect against reverse polarity, prior art protection designs included blocking diodes. In such circuits, the diode conducts when the supply voltage is connected with proper polarity. When the supply voltage is connected with reverse polarity, the diode does not conduct. When the diode conducts, it contributes 0.3 to 1.0 voltage loss to the circuit. The voltage loss results in associated power loss to the circuit as well.

To protect from over voltage, one implementation uses a fuse and clamping zener diode. When an over voltage condition occurs, the zener diode conducts, clamping the supply and blowing the fuse. While this design offers protection, the protection elements, zener diode and/or fuse, are not reusable once a supply voltage has been incorrectly installed in the circuit. For example, when a supply voltage is improperly installed, the zener diode and/or fuse is destroyed rendering the DC powered device inoperable. The diode or fuse would have to be replaced before the DC powered device would be operable with a properly installed supply voltage. Depending on the location of the protection element in the circuit, replacement may not be an easy task.

Another implementation to protect against over voltage utilizes a single bipolar junction transistor, (BJT), connected in series with the supply. The BJT acts as a switch; when the supply voltage is below a certain level, the BJT is on; when the supply voltage is above the threshold, the BJT is off. When the BJT is on, it may produce unacceptable losses in certain applications. This is due to the amount of base current required to cause a BJT to conduct, i.e. be on. Examples of prior art protection circuits are the Motorola MC3399T and the Maxim MAX625.

Therefore a need exists for a means and a method for protecting DC powered devices from over and reverse voltage supplies while minimizing the drawbacks of the prior art solutions.

DESCRIPTION OF A PREFERRED EMBODIMENT

Figure 1:
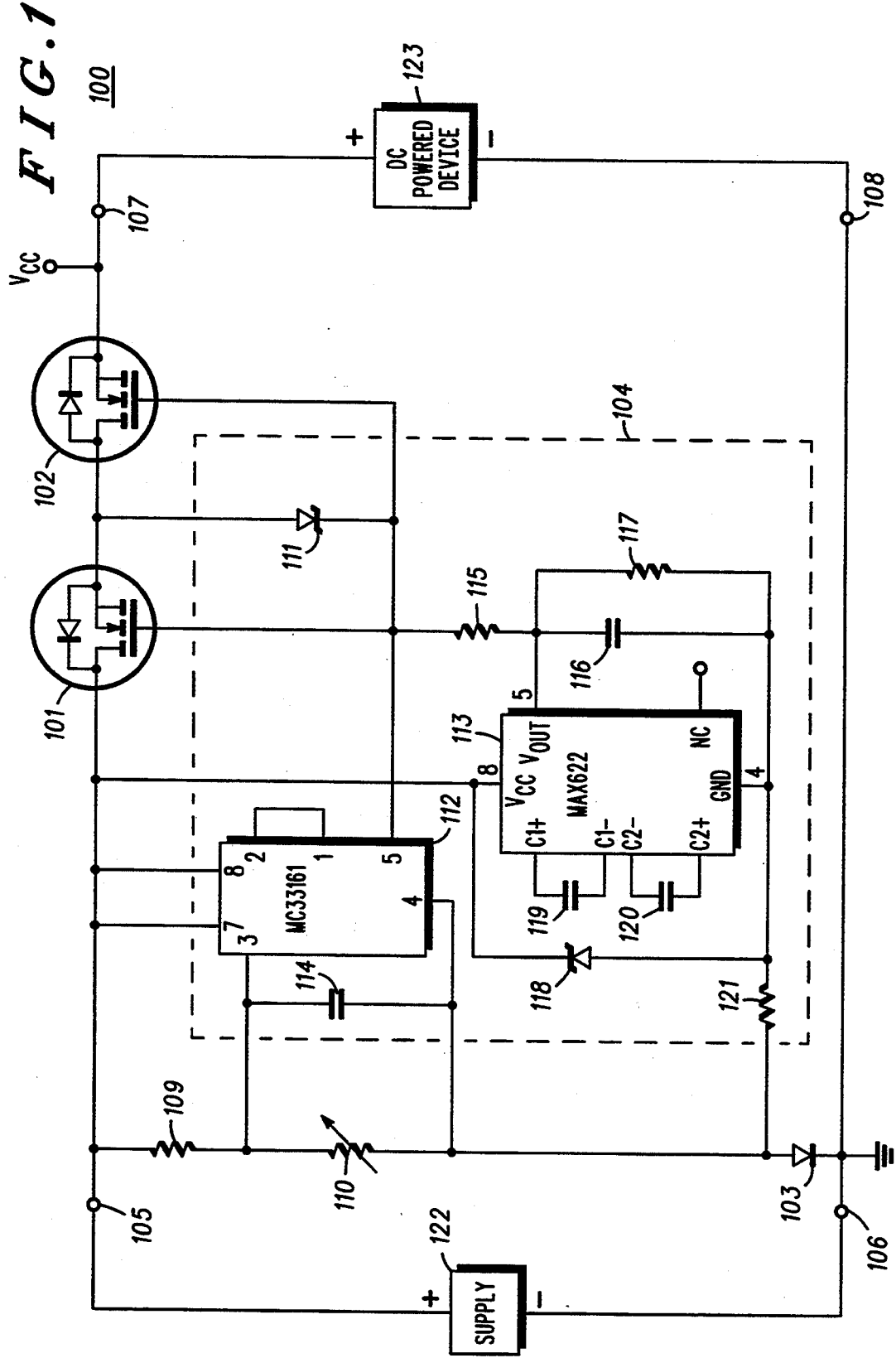
FIG. 1 illustrates an over voltage/reverse voltage protection circuit in accordance with the present invention.

The present invention provides an apparatus and method for protecting DC powered devices from the application of a supply voltage that is too large or reversed due to improper installation. This is accomplished with greater electrical efficiency and energy savings than previously possible. A gate supply and control circuit allows the use of low-loss field effect transistors (FETs) to conduct current only when the applied voltage is below a safe level and is the correct polarity. Further, the present invention is self-resetting, that is, normal operation resumes once the faulty installation is corrected.

The present invention can be more fully described with reference to FIG. 1. FIG. 1 illustrates an over voltage/reverse voltage protection circuit 100 that includes a first FET 101, a second FET 102, a blocking diode 103, a gate circuit 104, terminals 105-108, resistors 109 and 110, voltage supply 122 and a DC powered device 123. The gate circuit 104 includes two zener diodes (111 & 118), a voltage detector integrated circuit (IC) 112, a charge pump IC 113, four capacitors (114, 116, 119, & 120), and three resistors (115, 117, & 121).

The positive supply lead of the DC device 123 is connected to terminal 107, and the negative lead, or return, is connected to terminal 108. The normal, or correct connection of the voltage supply 123 has the positive supply lead connected to terminal 105 and the negative supply lead, or return, connected to terminal 106.

The FETs 101 and 102 are used as switches to either pass or block current from the DC supply to the DC device being protected. FET 101 and 102 are configured with their source terminals connected together at the anode of zener diode 111 and with their gate terminals connected together at the cathode of zener diode 111. The drain of FET 101 is connected to terminal 105 and the drain of FET 102 is connected to terminal 107. The FETs are n-channel enhancement mode types, that is, they are "off" when no bias voltage is applied between gate and source terminals. A voltage of 5 to 10 volts must be applied between the gate and source terminals to turn the FETs "on". In the "on" state each FET exhibits a very low resistance to current flow, on the order of 0.030 ohms. Note that when the FETs are off, the intrinsic diode of FET 101 acts as a blocking diode to prevent current flow through the intrinsic diode of FET 102.

The magnitude of the voltage applied between terminals 105 and 106 is sampled at the junction of resistors 109 and 110 by the gate circuit 104. From that sampling, the gate circuit 104 determines whether the DC supply voltage is less than a preset value which may be a potentially destructive level for the DC device 123. If the supply voltage is safe, (i.e. the voltage is above a minimum predetermined voltage and below a maximum predetermined voltage), the gate circuit 104 generates sufficient bias voltage to switch FETs 101 and 102 to the "on" state and to maintain them in that state. Diode 103 provides a negative return path for the gate circuit 104 during normal operation, and the diode blocks reverse current from entering the gate circuit 104 if the DC supply 122 at terminals 105 and 106 is reversed.

Within the gate circuit 104, the voltage detector IC 112 compares the sampled voltage at the junction of resistors 109 and 110 with a stable, internal 1.27 volt reference. Capacitor 114 and resistor 109 attenuate possible high frequency noise signals present on the DC supply leads that might be large enough to cause improper voltage detection by the voltage detector IC 112. If the sampled voltage is less than the internal reference voltage, output pin 5 of the voltage detector IC 112 remains a high resistance. This allows the charge pump IC 113 to develop a bias voltage to switch on FETs 101 and 102. Zener diode 118 and resistor 121 form a shunt regulator that limits supply voltage for the charge pump IC 113 to less than 6 volts. The charge pump IC 113 develops bias voltage by first charging capacitors 119 and 120 to the voltage across pins 8 and 4. Then IC 113 connects the two capacitors in series with each other and with pin 8 thereby developing a voltage at pin 5 that is three times the original voltage between pins 8 and 4. Capacitor 116 serves as a reservoir for the tripled voltage and substantially attenuates ripple voltage generated during the tripling process. Resistor 117 is a bleeder resistor that discharges capacitor 116 when the DC supply 122 is disconnected. Resistor 115 and zener diode 111 form a shunt regulator to limit bias voltage applied between gate and source terminals of the FETs.

In one implementation of the present invention a delicate accessory circuit could be protected during installation. A complex system such as a digital computer often has several supply voltages present, thereby increasing the probability of an improper connection capable of damaging the accessory circuit. Many digital components likely to be found in the accessory circuit operate satisfactorily only within a narrow range of +/−0.50 volts of a nominal supply of 5.00 volts. The supply voltage available in a large system is usually tightly regulated to within +/−0.25 volts of a nominal 5.00 volts. If the actual supply voltage is at 4.75 volts, the voltage drop of an intervening protective circuit must be less than 0.25 volts yielding 4.50 volts for the accessory to operate properly.

The low voltage drop inherent in the present invention is particularly useful in this case. The total "on" resistance of two typical FETs cascaded is as low as 0.06 ohms for typical devices. If other resistive losses are controlled by the use of large enough conductors, the invention can pass one ampere of direct current and still produce only a 0.06-volt drop. The power lost in this case is 0.06 watt. Power lost in producing gate bias voltage for the two FETs is less than 0.001 watt. In comparison, a prior art protection circuit used a single bipolar junction transistor (BJT) instead of FETs 101 and 102. The typical voltage drop with a BJT is about 0.3 volt for a power loss of 0.3 watt. The base current required to cause a BJT to conduct one ampere can be as high as 0.1 ampere resulting in 0.5 watt additional dissipation for a 5-volt supply. In many portable, battery-powered applications, such power losses are unacceptably high.

When the supply voltage 122 is excessively high, resistors 109 and 110 trigger voltage detector IC 112 causing the output at pin 5 of the voltage detector IC 112 to become a low resistance. This sinks all current produced by the output of the charge pump IC 113 so that bias voltage cannot be established for FETs 101 and 102. In the over voltage case, FET 101 is the operative device that prevents current flow up to its breakdown voltage. The intrinsic, parasitic diode of FET 102 would conduct current with or without bias voltage applied to the gate and source terminals.

As mentioned in the previous example for normal operation, a complex system such as a digital computer often has several supply voltages present, and an accessory could be inadvertently connected to the wrong supply. Application of as little as +6 volts DC is sufficient to permanently damage numerous components of the accessory. The sampling resistors 109 and 110 of the invention can be chosen to trigger the voltage detector IC 112 at an input (terminals 105 to 106) of 5.5 volts to protect the accessory from inadvertent connection to supplies such as 7, 12, or 15 volts. If such a connection occurs, the open collector output of the voltage detector IC 112 saturates to divert current from the output of the charge pump IC 113 thereby clamping the gate-to-source voltage of FET 101 to a few tenths of a volt. This is far too small to allow FET 101 to conduct significant current. The presence and state of FET 102 is irrelevant in the case of an over voltage installation. When the accessory protected by the present invention is eventually connected to a supply of proper amplitude normal operation will resume.

When the voltage supply 122 is connected in reverse polarity, (i.e. +to-and-to+), to terminal 105 and 106, no current flows to the output terminals 107 and 108 because FET 102 and diode 103 prevent reverse current flow. FET 102 is necessary since the intrinsic, parasitic diode of FET 101 would conduct reverse current with or without applied gate-to-source bias voltage. Diode 103 prevents reverse current flow through the intrinsic, parasitic diodes of ICs 112 and 113. If not limited, such reverse current would destroy ICs 112 and 113. In addition, diode 103 is necessary to block current flow that could establish bias voltage sufficient to switch FET 102 to its "on" state.

The previous example of a complex system such as digital computers still applies, and an accessory could be inadvertently connected to the DC supply with positive and negative leads reversed. Application of reverse DC voltage will almost certainly damage numerous components of the accessory. Up to their breakdown voltage, FET 102 and diode 103 will block current to prevent reverse current flow and consequent damage either to the accessory circuit or to ICs 112 and 113. The presence and state of FET 101 is irrelevant in the case of a reverse voltage installation.

A power junction rectifier could be substituted for FET 102 to block reverse current flow however, in normal operation, voltage drop would be between 0.3 and 1.0 volt depending on the type of rectifier. At a forward current of one ampere power loss would be an unacceptably high 0.3 to 1.0 watt.

The implementation of the present invention placed FETs 101 and 102 in the positive lead between the DC source and the DC device being protected since most applications require a common, uninterrupted negative return line. For those applications requiring a common positive return, the present invention can be modified by placing FETs 101 and 102 in the negative lead. If the DC supply is at least 5 volts, low-threshold FETs can be used in the negative lead to allow elimination of the charge pump IC 113.

The present invention offers over voltage and reverse voltage protection with much lower losses than previous methods. Loss in terms of voltage drop is critical in applications in which devices are already operating near their minimum operating voltage and no additional voltage drop can be tolerated. Loss in terms of power causes greater heat generation that may be difficult to control in high-power or miniature applications. In addition, power loss translates into shorter battery life for portable applications. A prior art series BJT or rectifier are simpler solutions, but losses are significantly higher. P-channel FETs placed in the positive line initially appear to offer simplification by eliminating the charge pump, but the physical nature of p-channel FETs causes them to have higher loss and higher gate bias threshold. Finally, the present invention is self-resetting compared to the simple but low-loss solution of a series fuse and shunt zener diode regulator. After improper installation, the series fuse/shunt zener requires maintenance.

I claim:

1. A circuit for protecting direct current (DC) powered devices from excessive supply voltage and reverse polarity supply voltage, the circuit comprising:
   supply voltage coupling means for coupling a DC powered device to a supply voltage:
   a first field effect transistor (FET) having an intrinsic diode, wherein the first FET is operably coupled to the supply voltage coupling means;
   first current blocking means, operably coupled to the first FET, for substantially blocking current flow through the intrinsic diode;
   gate supply means, operably coupled to the first FET and the supply voltage coupling means, for supplying gate voltage to the first FET when the supply voltage is less than a predetermined value; and
   second current blocking means, operably coupled to the gate supply means, for blocking current flow to the gate supply means when the supply voltage is reversibly coupled to the DC powered device such that the gate supply means does not supply gate voltage to the first FET.

2. The circuit of claim 1, wherein the supply voltage coupling means further functions to provide a supply line terminal and a return terminal.

3. The circuit of claim 2, wherein the first FET is operably coupled to the supply line terminal.

4. The circuit of claim 2, wherein the first FET is operably coupled to the return terminal.

5. The circuit of claim 1, wherein the first current blocking means further functions as a second FET, and wherein the source of the first FET is directly coupled to the source of the second FET.

6. A method for protecting direct current (DC) powered devices from excessive supply voltage and reverse polarity supply voltage, the method comprising the steps of:
   a) determining whether voltage from a voltage source is above a predetermined voltage;
   b) blocking the voltage from the voltage source when the voltage from the voltage source is above the predetermined voltage thereby blocking the voltage from the DC powered device;
   c) determining whether the voltage source is connected in a reverse polarity manner; and
   d) blocking the voltage from the voltage source when the voltage source is connected in the reverse polarity manner thereby blocking the voltage from the DC powered device.

* * * * *